(12) United States Patent
Cai et al.

(10) Patent No.: US 12,025,565 B2
(45) Date of Patent: Jul. 2, 2024

(54) INSPECTION SYSTEM AND METHODS FOR INSPECTING AN OPTICAL SURFACE OF A LASER SCANNER

(71) Applicant: The Boeing Company, Chicago, IL (US)

(72) Inventors: Fei Cai, Edmonds, WA (US); Richard Calawa, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 17/653,779

(22) Filed: Mar. 7, 2022

(65) Prior Publication Data

US 2023/0280279 A1    Sep. 7, 2023

(51) Int. Cl.
  *G01N 21/88* (2006.01)
  *B23K 26/70* (2014.01)

(52) U.S. Cl.
  CPC ....... *G01N 21/8851* (2013.01); *B23K 26/707* (2015.10); *G01N 2021/8887* (2013.01); *G01N 2201/022* (2013.01); *G01N 2201/062* (2013.01); *G01N 2201/08* (2013.01)

(58) Field of Classification Search
  CPC ....... G01N 21/8851; G01N 2021/8887; G01N 2201/022; G01N 2201/062; G01N 2201/08; B23K 26/707
  See application file for complete search history.

(56) References Cited

U.S. PATENT DOCUMENTS

2014/0218725 A1*  8/2014  Lin ................ G01N 21/94
                                               356/239.8

FOREIGN PATENT DOCUMENTS

| DE | 102014203798 A1 | 9/2015 |
|----|-----------------|--------|
| EP | 1643281 A1 | 4/2006 |
| KR | 20070113381 A | 11/2007 |
| WO | 2015134291 A1 | 9/2015 |

* cited by examiner

*Primary Examiner* — Jamil Ahmed
(74) *Attorney, Agent, or Firm* — Quinn IP Law

(57) ABSTRACT

The present disclosure provides an inspection system and method for inspecting an optical surface of a laser scanner, the system including a directional optical source and an optical detector. The method includes moving one of the laser scanner or the inspection system to a position in which a beam axis of the directional optical source extends across but does not intersect the optical surface, between the optical surface of and the optical detector. The method further includes emitting a light beam from the directional optical source, across the optical surface so that light from the light beam is incident on debris disposed on the optical surface. The method further includes collecting the light at the optical detector to form an image that indicates presence of the debris on the optical surface of the laser scanner; and generating feedback to alert a user of the presence of the debris.

20 Claims, 12 Drawing Sheets

INSPECTION SYSTEM AND METHODS FOR INSPECTING AN OPTICAL SURFACE OF A LASER SCANNER

TECHNOLOGICAL FIELD

The present disclosure relates generally to laser scanners and, in particular, to automated laser scanner lens inspection systems.

BACKGROUND

Laser scanners are used in various ways during the manufacture of components for vehicles, such as, for example aircraft components. In one example, laser scanners can be used for laser ablation of the surfaces of components to increase adhesive capabilities of the surfaces of the components in order to make paint adhere to the surfaces of the components better. In order to ensure a high quality ablation of the surface, the optical surface of the laser scanner must be substantially unobstructed. That is, the outer portion of the optical surface at which the laser egresses the laser scanner must be substantially free from debris such that the laser light can egress the optical surface without being significantly deflected by debris on the optical surface.

Deflections of the laser light caused by optical surface debris can result in only part of the laser beam hitting the surface of the aircraft component being ablated, thereby resulting in reduced laser power hitting the component surface. This reduced laser power impacting the component surface leads to less surface material being etched and an inferior ablation of the surface. Those having ordinary skill in the art will appreciate that the effectiveness of a laser scanner used for other purposes, other than laser ablation of a surface of a component, will be substantially reduced by the presence of debris on the optical surface of the laser scanner.

It would therefore be desirable to have a system and method that takes into account at least some of the issues discussed above, as well as other possible issues.

BRIEF SUMMARY

Example implementations of the present disclosure are directed to an inspection system for inspecting an optical surface of a laser scanner. The optical surface of the laser scanner is maneuvered to the inspection system (or vice versa) for detecting debris on the optical surface of the laser scanner. The optical surface is the egress point of the laser in the laser scanner. The inspection system comprises a directional optical source, such as a light emitting diode (LED), configured to emit a light beam across the optical surface, but the light beam does not intersect with the optical surface. The light beam extending across, and just above, the surface of the optical surface will impact on any debris in its path that is on the optical surface and deflect out.

The inspection system further comprises an optical detector, such as a camera, configured to capture light deflected from the optical surface. In cases where debris is on the optical surface, light from the directional optical source will impact on the debris and deflect off in the direction of the optical detector. The optical detector will capture images of the light and determine, from the images, if the amount of debris on the optical surface is above a predefined threshold. If it is, a computer associated with the inspection system will generate feedback to alert a user of the presence of the debris so that the optical surface can be cleaned.

The present disclosure thus includes, without limitation, the following example implementations.

Some example implementations provide an inspection system for inspecting an optical surface of a laser scanner, the inspection system comprising: a directional optical source configured to emit a light beam when at least one of the laser scanner or the inspection system are moved to a position in which a beam axis of the directional optical source extends across but does not intersect the optical surface of the laser scanner, between the optical surface of the laser scanner and an optical detector, the directional optical source configured to emit the light beam across the optical surface of the laser scanner so that light from the light beam is incident on debris disposed on the optical surface of the laser scanner; the optical detector configured to collect the light to form an image that indicates presence of the debris on the optical surface of the laser scanner; and a computer configured to generate feedback to alert a user of the presence of the debris.

Some example implementations provide a method of inspecting an optical surface of a laser scanner with an inspection system that includes a directional optical source and an optical detector, the method comprising: moving at least one of the laser scanner or the inspection system to a position in which a beam axis of the directional optical source extends across but does not intersect the optical surface of the laser scanner, between the optical surface of the laser scanner and the optical detector; emitting a light beam from the directional optical source, across the optical surface of the laser scanner so that light from the light beam is incident on debris disposed on the optical surface of the laser scanner; collecting the light at the optical detector to form an image that indicates presence of the debris on the optical surface of the laser scanner; and generating feedback to alert a user of the presence of the debris.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 4A:
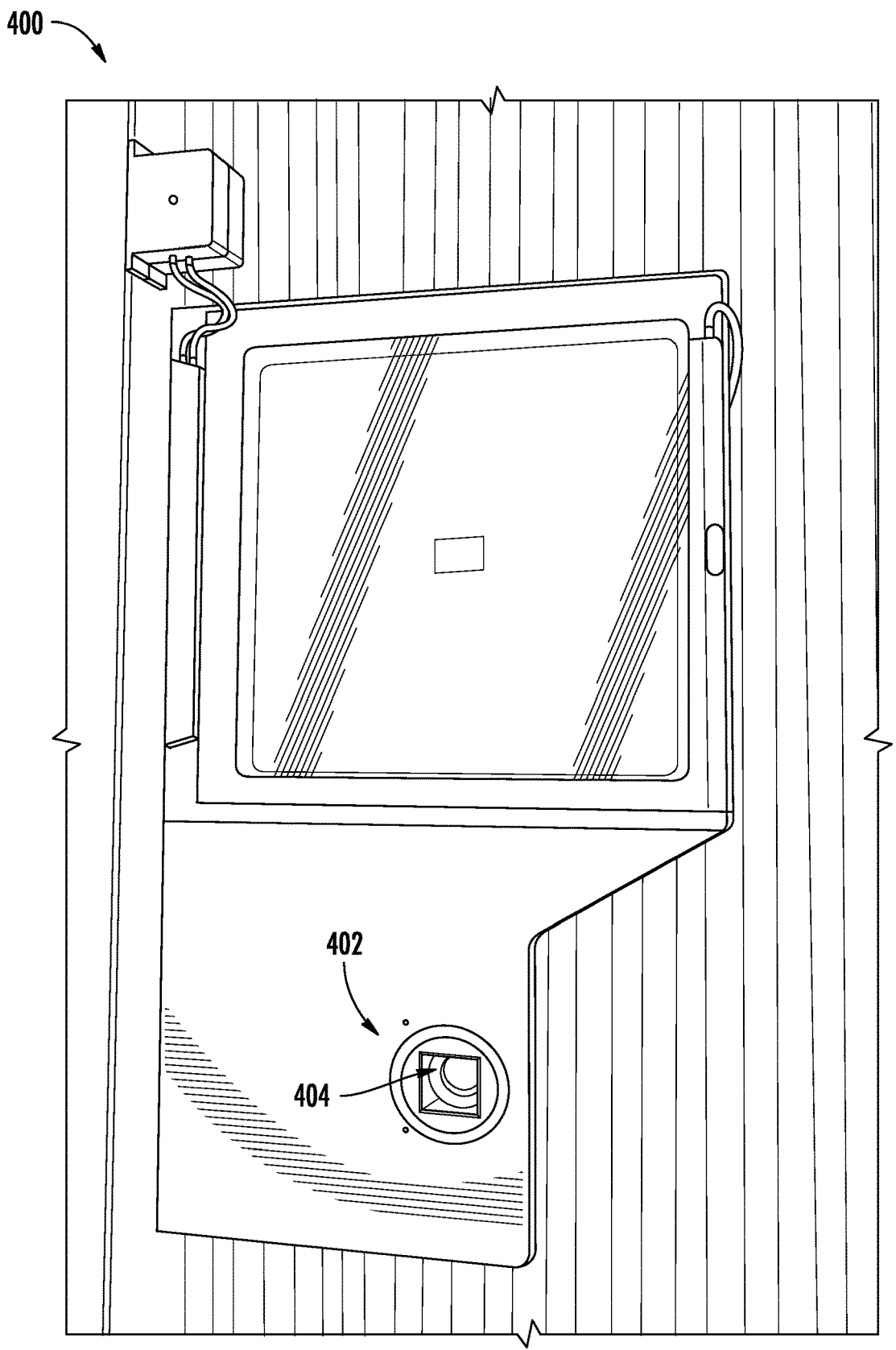
Figure 4B:
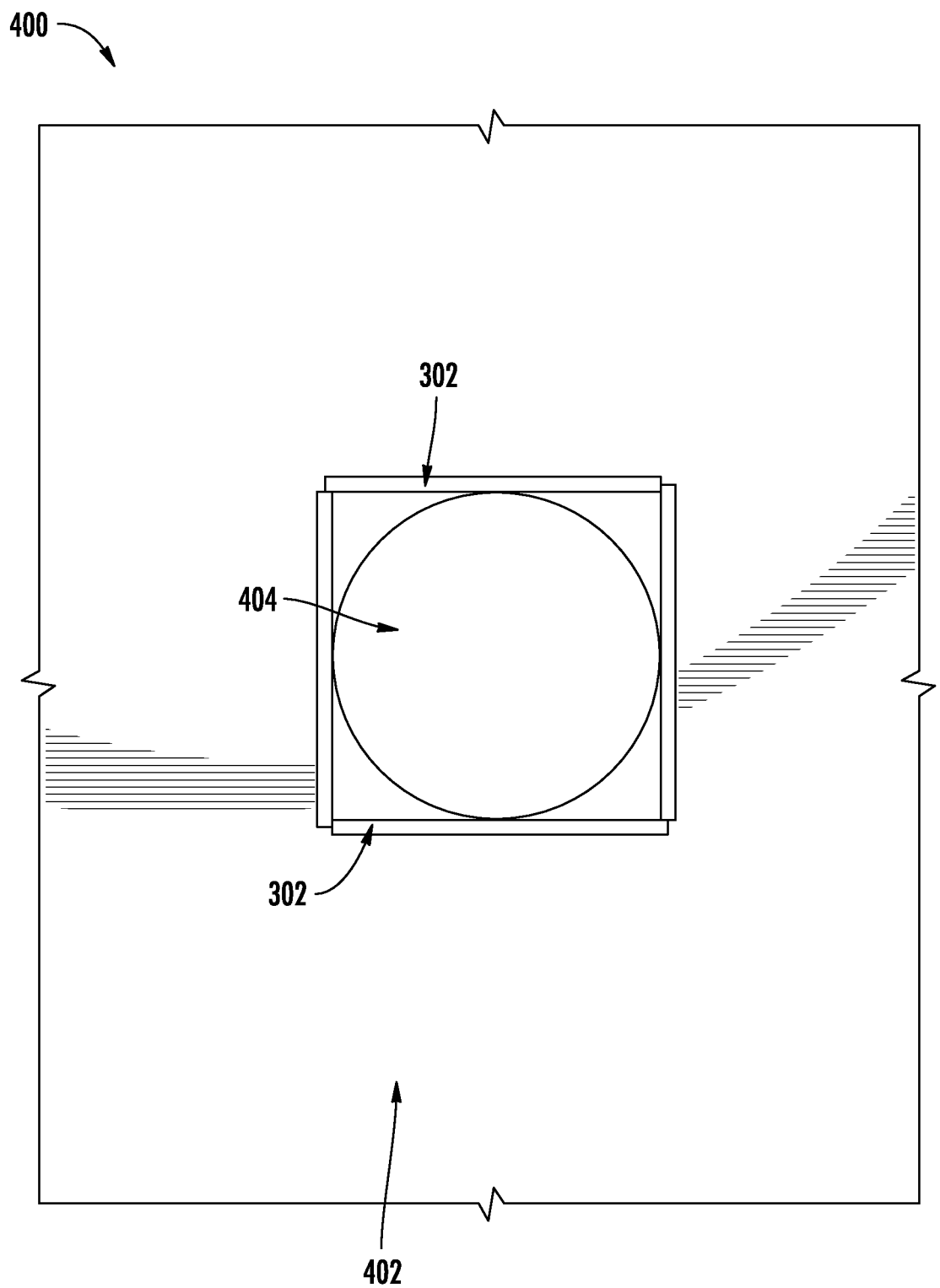
Figure 4C:
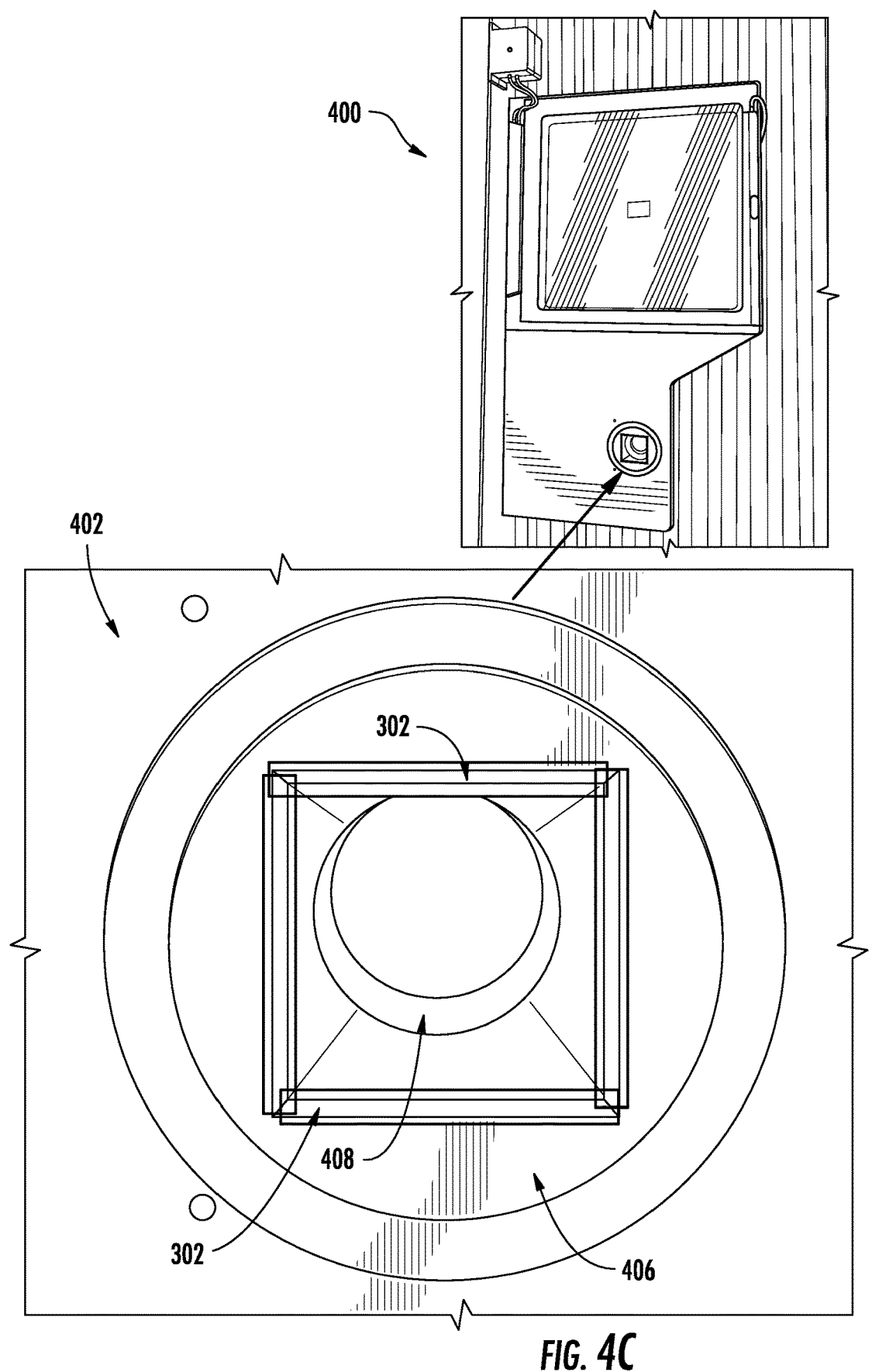
Figure 5A:
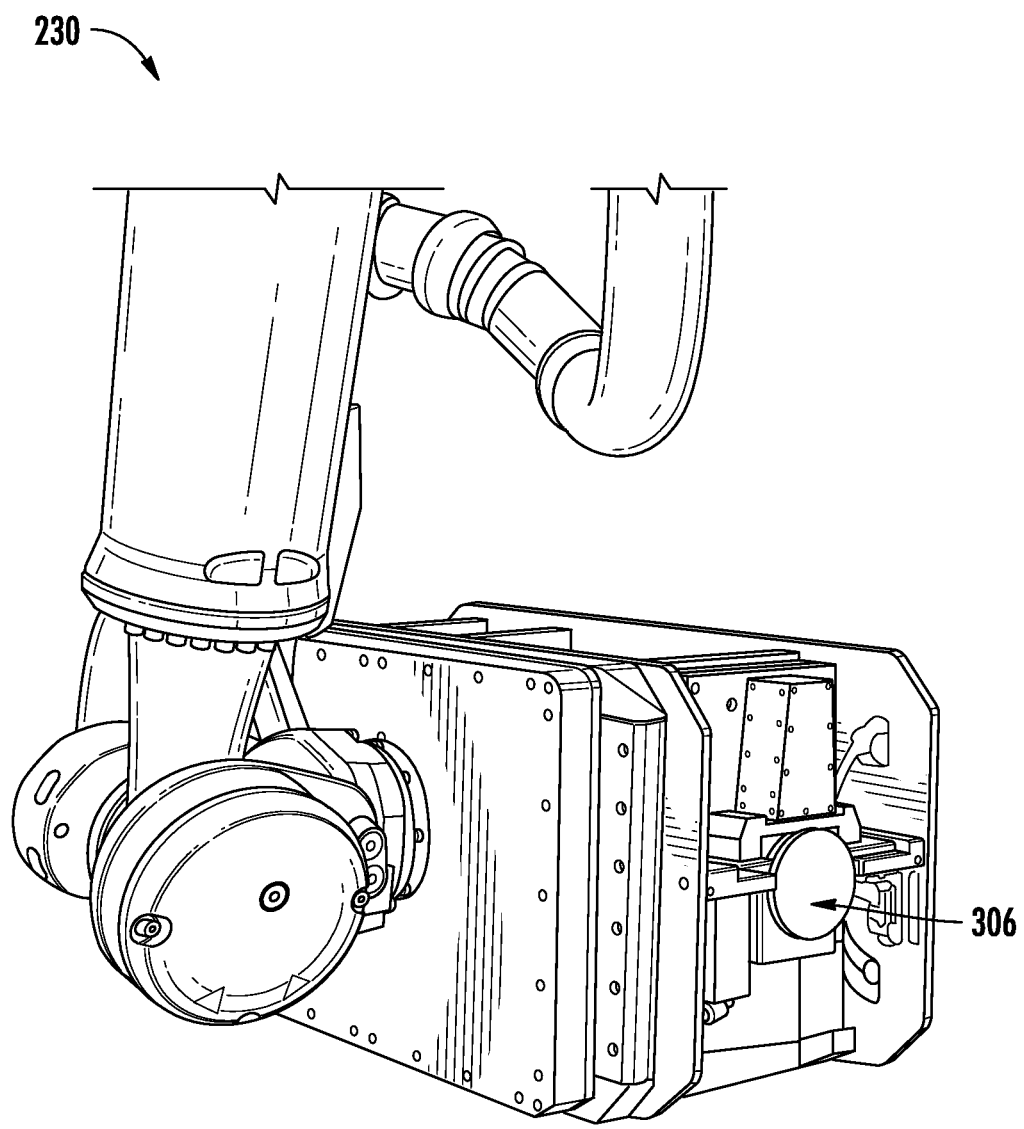
Figure 5B:
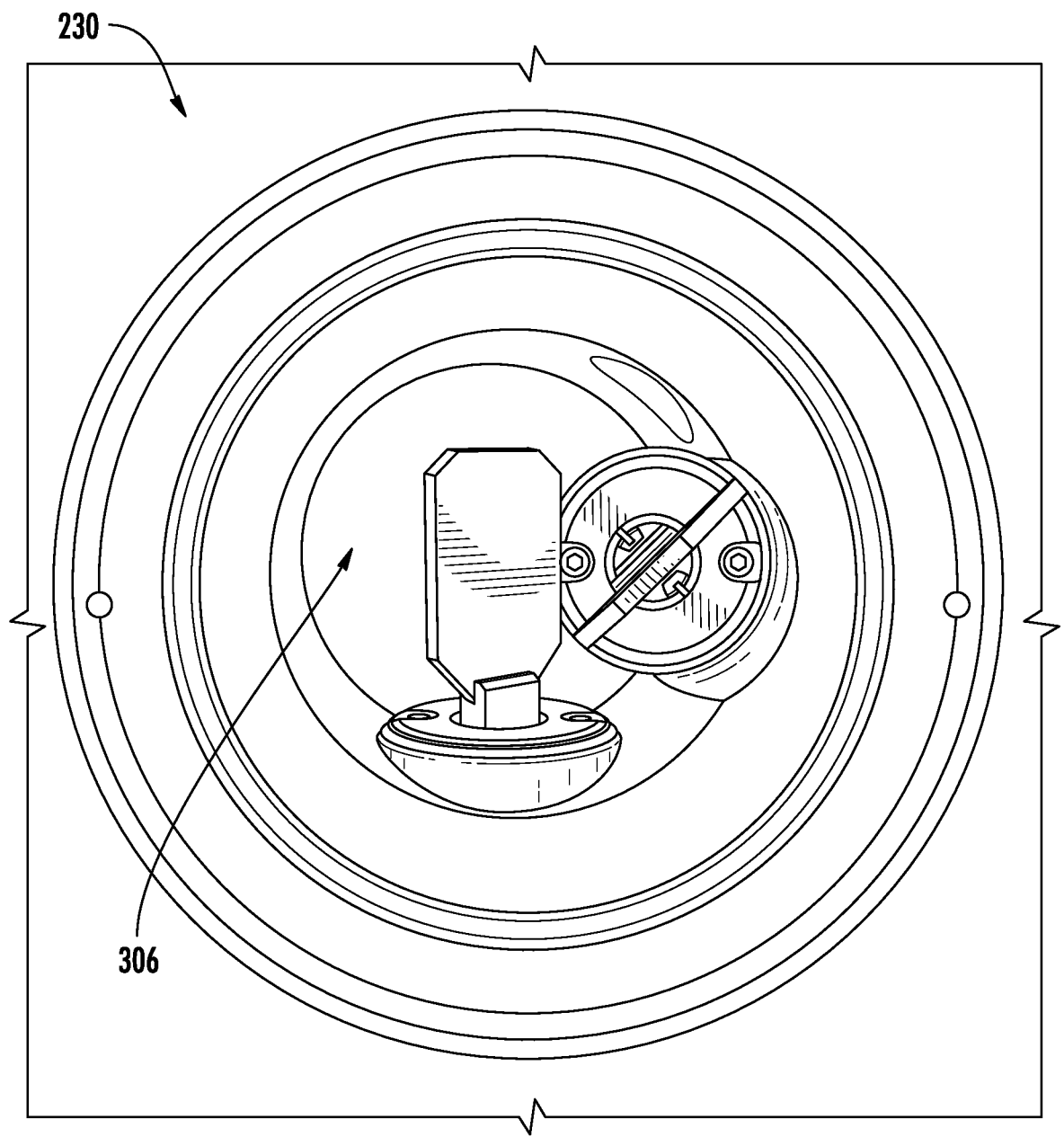
Figure 6:
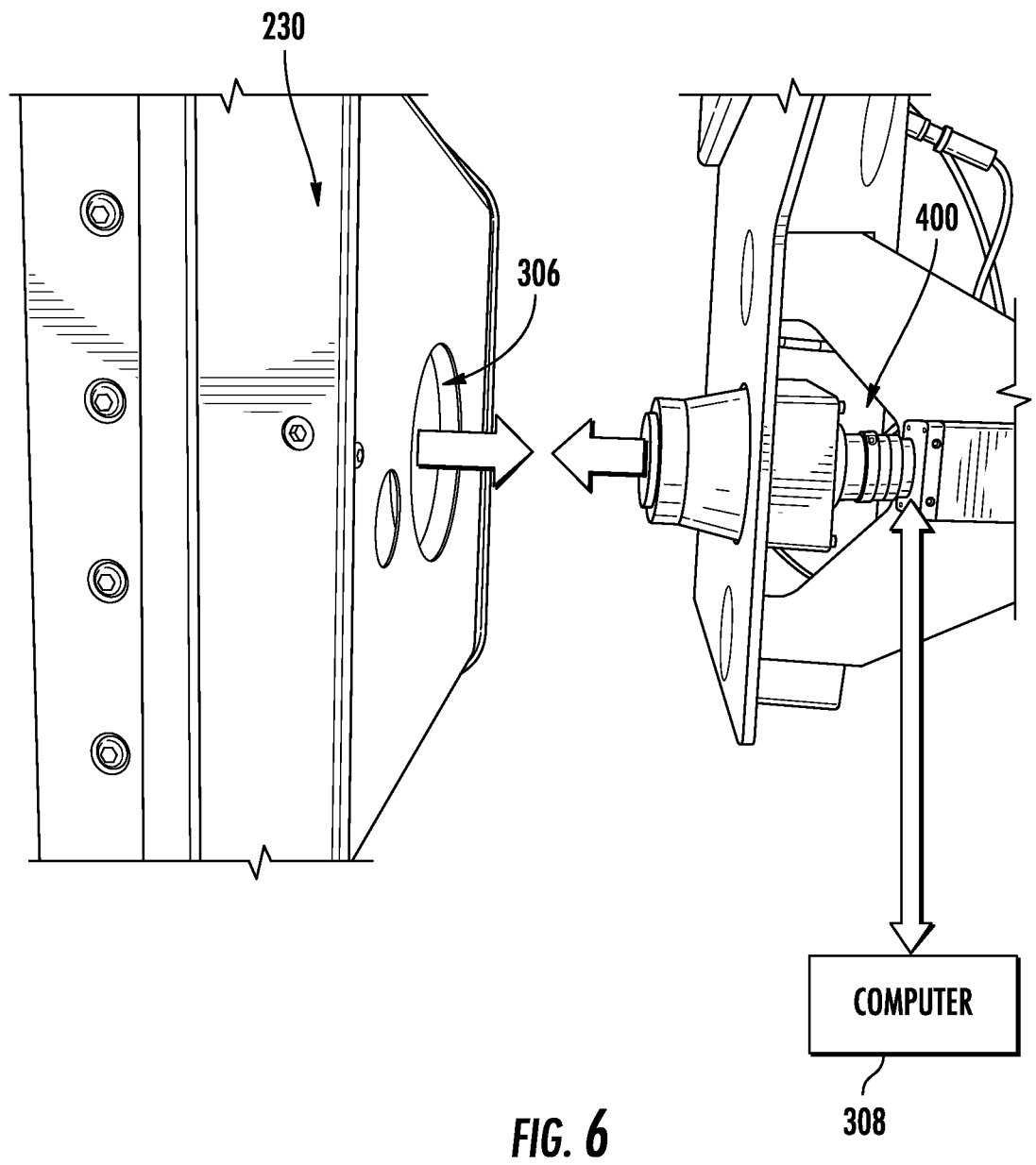
Figure 7B:
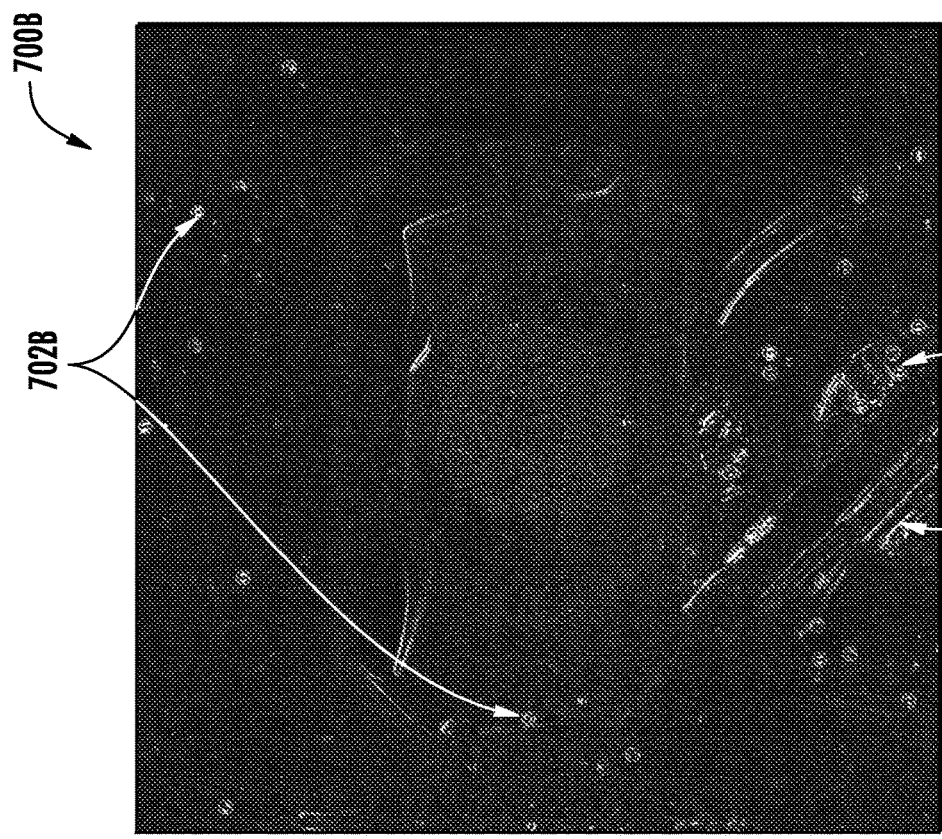
Figure 7A:
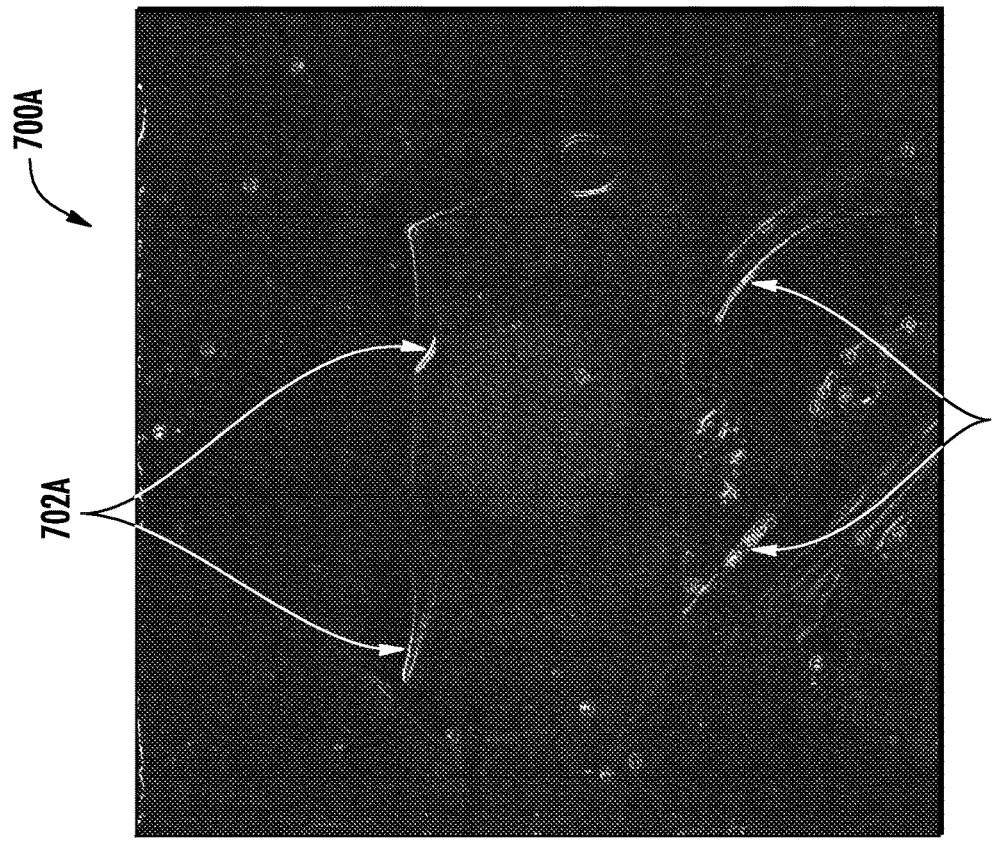
Figure 8A:
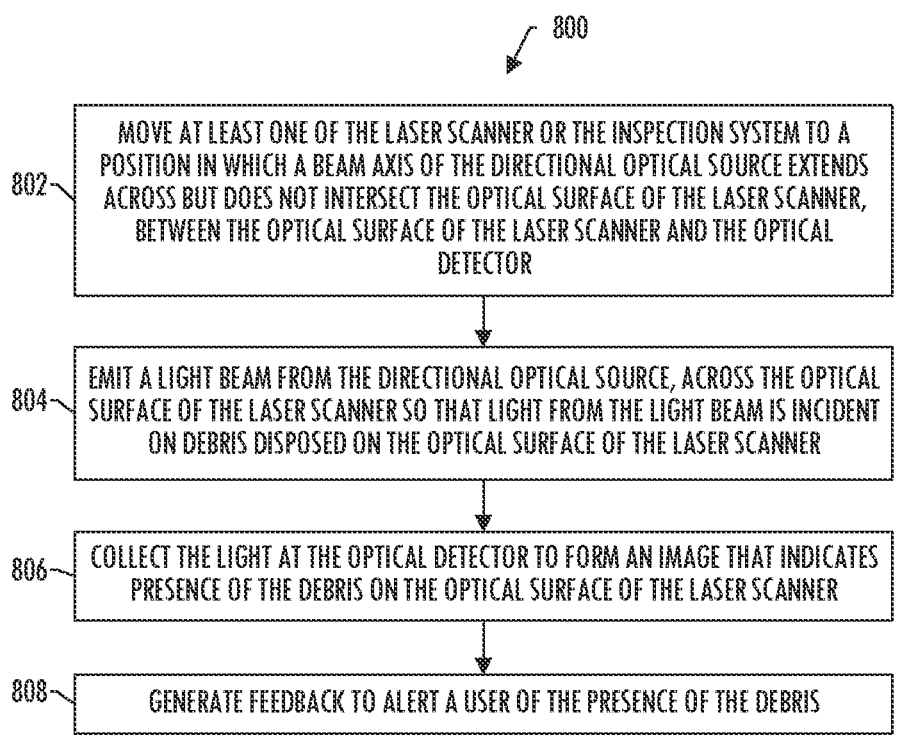
Figure 8B:
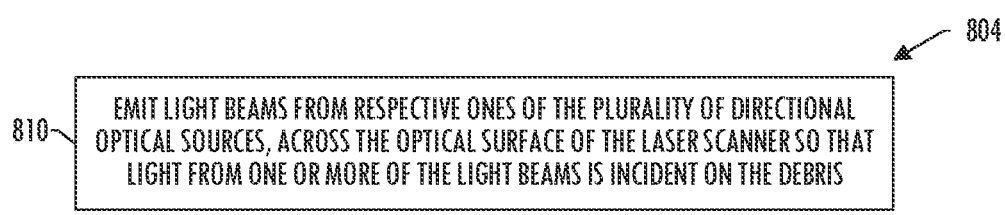
Figure 8C:
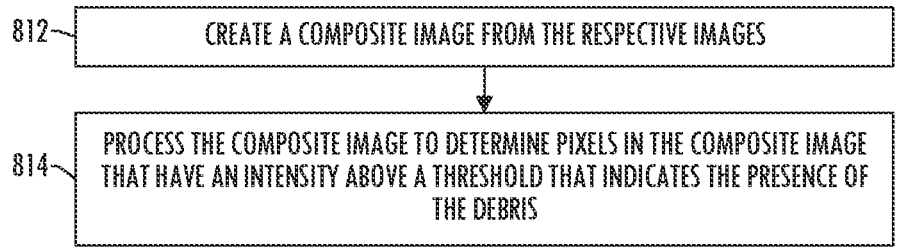

FIGS. 4A, 4B, and 4C illustrate various views of an inspection system, according to some example implementations;

FIGS. 5A and 5B illustrate various views of a laser scanner, according to some example implementations;

FIG. 6 illustrates the inspection system and laser scanner in position for inspection of the optical surface of the laser scanner by the inspection system, according to some example implementations;

FIG. 7A and FIG. 7B are example images captured by the optical detector of light being deflected off debris on the optical surface, according to some example implementations; and FIG. 8A, FIG. 8B, and FIG. 8C are flowcharts illustrating various steps in a method of inspecting an optical surface of a laser scanner, according to example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

Figure 1:
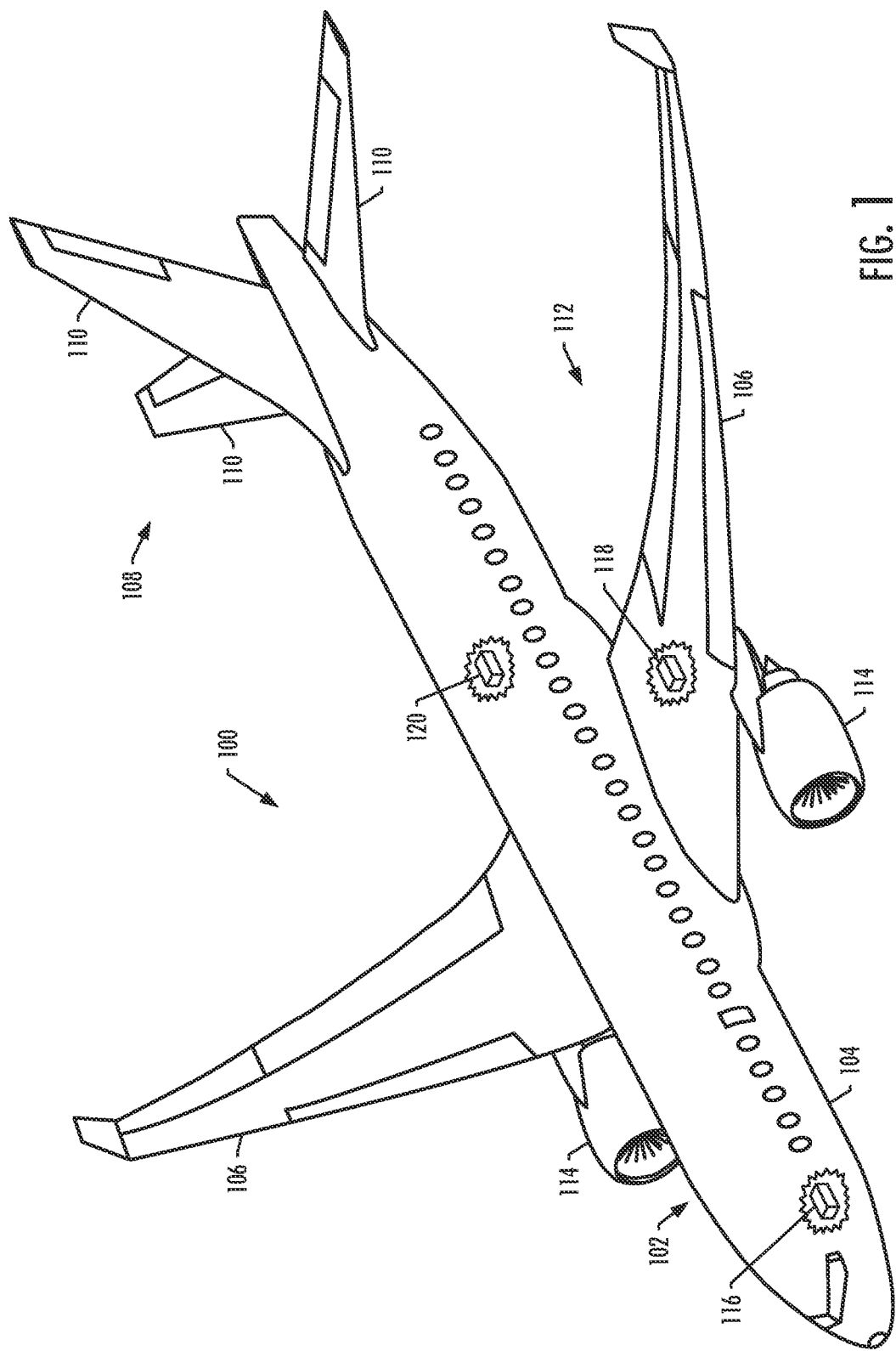
FIG. 1 illustrates one type of vehicle, namely, an aircraft that may benefit from example implementations of the present disclosure.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

Figure 2:
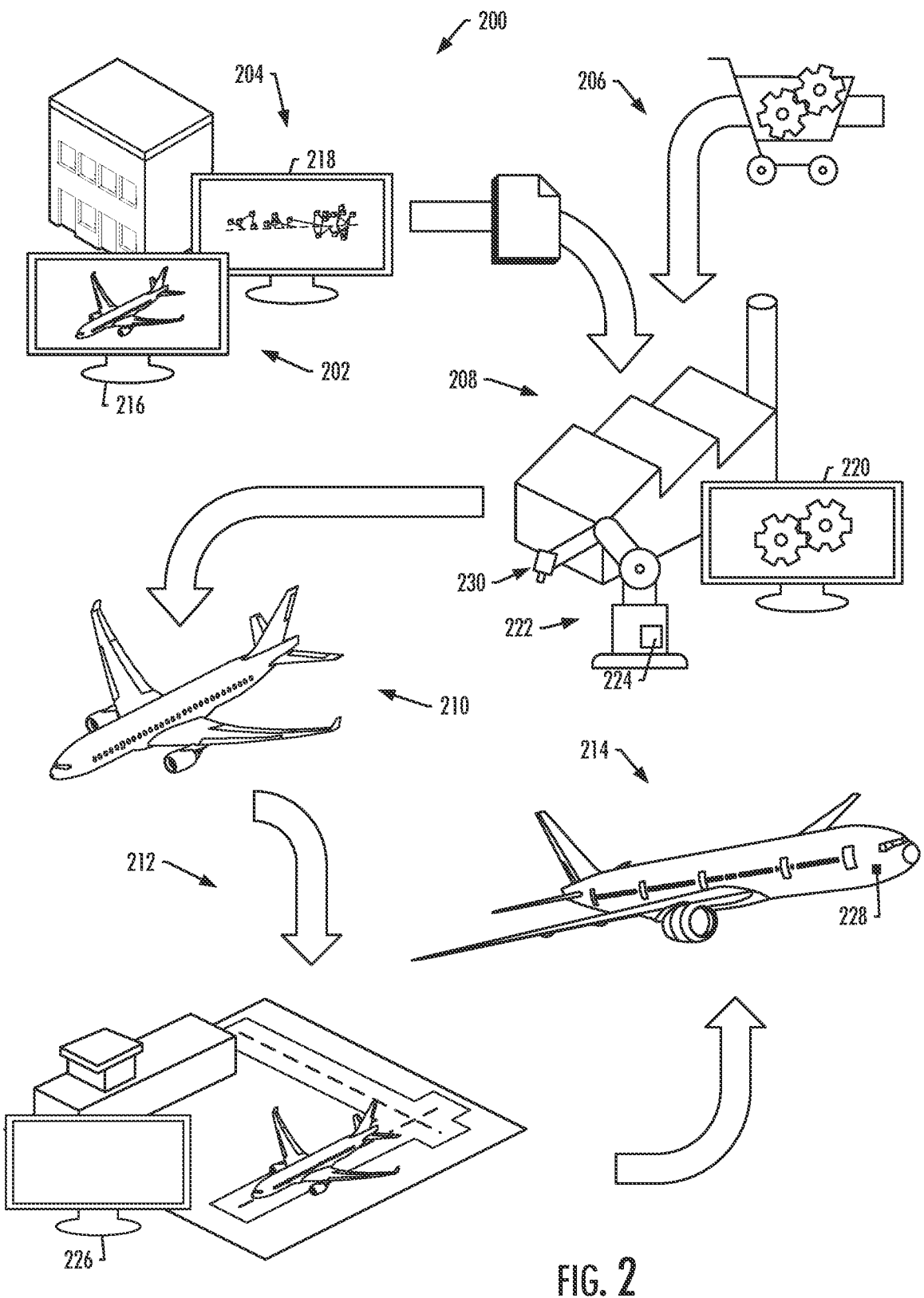
FIG. 2 illustrates an aircraft manufacturing and service method, according to some example implementations.

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As will also be appreciated, computers are often used throughout the method 200; and in this regard, a "computer" is generally a machine that is programmable or programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines, machine tools 222 or other robotics that are controlled by computers 224. The machine tools may include one or more lasers or laser scanners 230 that are generally configured to perform laser ablation of surfaces of components and other tasks. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216-228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Example implementations of the present disclosure may be implemented throughout the aircraft manufacturing and service method 200, but are particularly well suited for implementation during production, and while in service. In this regard, some example implementations provide inspection systems and methods for inspecting an optical surface of a laser scanner.

Figure 3:
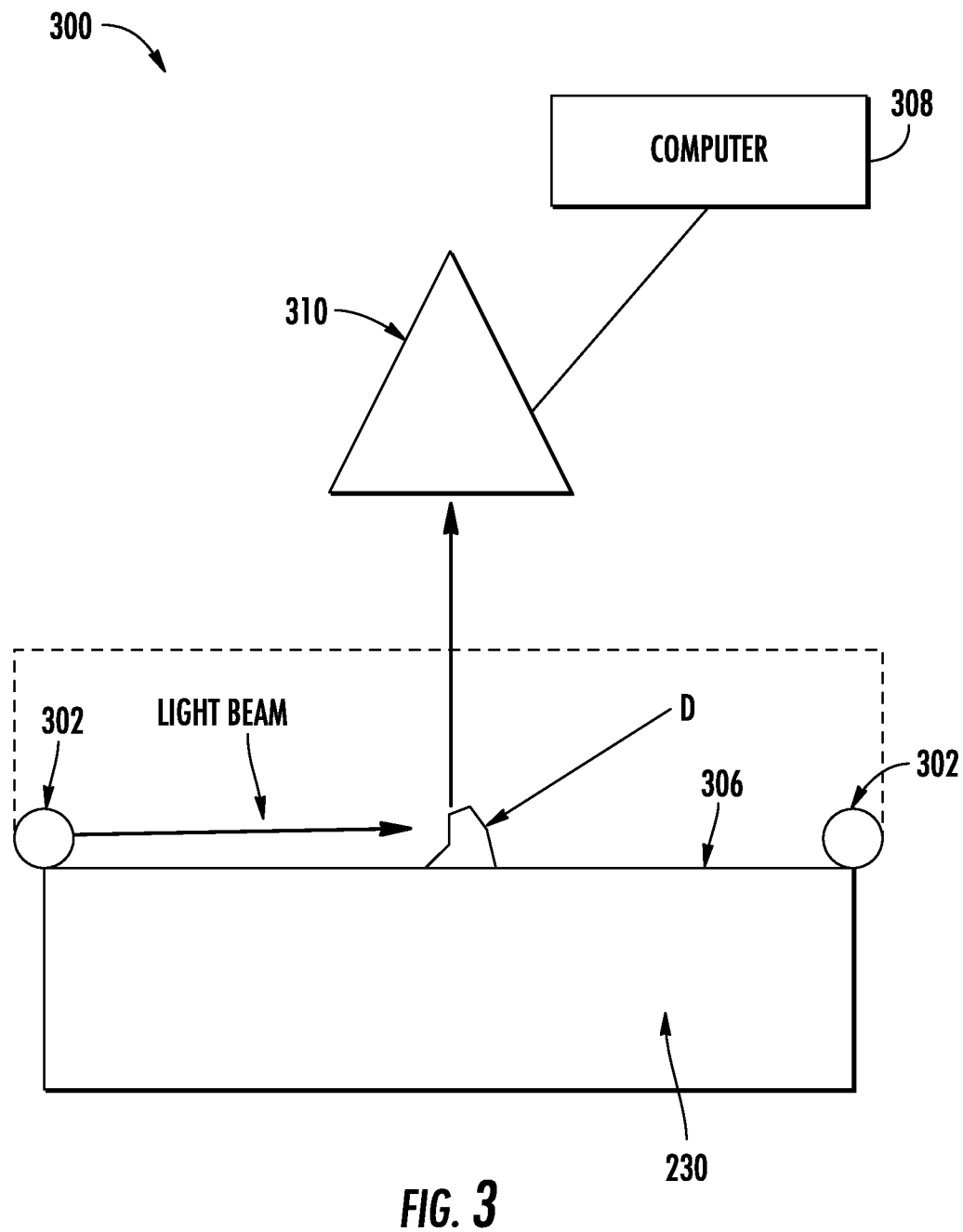
FIG. 3 illustrates a block diagram detailing various components of an inspection system, according to some example implementations.

FIG. 3 illustrates a block diagram of an inspection system 300 for inspecting an optical surface 306 such as a lens of a laser scanner 230, according to some implementations of the present disclosure. The inspection system includes one or more of each of a number of components such as a directional optical source 302 (two shown), an optical detector 310, and a computer 308. FIG. 3 further illustrates how the directional optical source and optical detector interact with debris D on an optical surface 306, for example, an optical surface of a laser scanner 230 used in the process described with respect to FIG. 2. One purpose of the inspection system is to detect the debris on the optical surface. In performing this inspection, in some implementations, the directional optical source is configured to emit a light beam across the optical surface when at least one of the laser scanner or the inspection system are moved to a position in which a beam axis of the directional optical source extends across, but does not intersect the optical surface of the laser scanner. Furthermore, in the position to which the at least one of the laser scanner or the inspection system is moved, the directional optical source is positioned on a perimeter of the optical surface of the laser scanner.

As illustrated in FIG. 3, the light beam(s) is emitted between the optical surface 306 of the laser scanner 230 and the optical detector 310. The directional optical source 302 is configured to emit the light beam across the optical surface of the laser scanner so that light from the light beam(s) is incident on debris D disposed on the optical surface of the laser scanner. When light from the light beam hits the debris, it deflects off the debris toward the optical detector. The optical detector is configured to collect the light that is deflected off the debris to form an image that indicates presence of the debris on the optical surface of the laser scanner.

In some example implementations, the optical detector 310 comprises a camera, or other suitable light capturing device, configured to collect light deflected off the debris D to form an image that indicates presence of the debris on the optical surface. As described above, in some implementations, the inspection system 300 includes a computer 308 configured to generate feedback to alert a user of the presence of the debris. As described further herein, the computer may also be configured to control various aspects of the optical detector, including processing one or more of the captured images, and the directional optical source 302.

Those having ordinary skill in the art will appreciate that the inspection system 300 can be embodied in any suitable form and configured in any suitable manner such that the operations of the system described herein can be performed. In this regard, FIGS. 4A, 4B, and 4C illustrate various views of an inspection system 400 that may correspond to inspection system 300, according to some example implementations. As shown in FIG. 4A, the inspection system includes a housing 402 in which the optical detector 310 is contained. The housing defines a housing aperture 404, and the directional optical source 302 (not shown) is positioned on a perimeter of the housing aperture.

FIG. 4B illustrates a close-up exterior view of the inspection system 400. The directional optical source 302 may comprise any suitable light source. In some example implementations, the directional optical source includes an optical fiber configured to carry light to a fiber tip at which a light beam is emitted. In such an implementation, the fiber tip is positioned on the perimeter of the housing aperture 404 so that the light beam is emitted across the housing aperture. In some other example implementations, the directional optical source comprises one or more light emitting diodes (LEDS).

In some example implementations, the directional optical source is contained in the housing 402 of the inspection system 400. For example, the directional optical source 302 (i.e., the fiber optic cables, if used) can be integrated within the housing, including around a perimeter of the housing aperture 404 such that light emitted by the directional optical source is emitted across the opening of the housing aperture. In the position to which the at least one of the laser scanner 230 or the inspection system is moved, the directional optical source is positioned over the housing aperture and exposed to the optical detector 310 contained within the housing. In this position, the housing aperture is covered by the laser scanner to block ambient light from entering the housing through the housing aperture.

In some other examples, the inspection system 400 comprises a plurality of directional optical sources 302 positioned and distributed around the perimeter of the housing aperture 404. In this example implementation, and in the position to which the at least one of the laser scanner 230 or the inspection system is moved, beam axes of respective ones of the plurality of directional optical sources extend across but do not intersect the optical surface 306 of the laser scanner. Like the implementation with only one directional optical source, respective ones of the plurality of directional optical sources are configured to emit light beams across the optical surface of the laser scanner so that light from one or more of the light beams is incident on the debris D. Furthermore, in some example implementations, the light beams can be emitted individually for respective ones of the light beams to form respective images, one or more of which indicates the presence of debris on the optical surface of the laser scanner.

In some examples, the housing aperture has any suitable shape. For example, in some implementations, the perimeter of the housing aperture has a circular, square, rectangular, triangular, pentagonal, or hexagonal shape. In either case, in some implementations the directional optical source comprises a plurality of directional optical sources distributed around all the sides of the perimeter of the optical aperture.

In some example implementations, the housing aperture 404 is configured to be aligned with the optical surface 306 of a laser scanner 230, such as the one shown in FIG. 5A and FIG. 5B, that is moved to the system 400. In other words, a central axis of the housing aperture can be substantially aligned with a central axis of the optical surface. The housing aperture has a diameter, width, and/or length, that is equal to or greater than a diameter, width, or length of the optical surface. With the housing aperture being aligned with the optical surface and the housing aperture having a larger diameter, width, and/or length than the optical surface, this allows the directional optical source to emit one or more beams that travel across the entire diameter, width, or length of the optical surface.

As illustrated in FIG. 4C, in some example implementations, the inspection system 400 can comprise a mount 406 on an outer surface of the housing 402 over the housing aperture 404. In such implementations, the mount defines a mount aperture 408 that overlaps the housing aperture. In other words, a central axis of the mount aperture aligns with a central axis of the housing aperture. In some example implementations, the mount aperture and housing aperture can have any suitable shape, and their respective shapes can be different or the same shape(s). For example, as shown in FIG. 4B and FIG. 4C, the housing aperture can have a circular shape and the mount aperture can have a square or rectangular shape.

Furthermore, in this example implementation, the directional optical source 302 can be positioned on a perimeter of the mount aperture 408 and thereby the perimeter of the housing aperture 404. As described above, in some example implementations, the directional optical source can include optical fiber configured to carry light to a fiber tip at which a light beam is emitted. The fiber tip can be or positioned around the perimeter of the mount aperture (e.g., integrated within the mount 406 on the perimeter of the mount aperture) so that the light beam is emitted across the mount aperture and thereby the housing aperture.

Also as described above, the directional optical source 302 can comprise a plurality of directional optical sources, each comprising a fiber tip. In such an embodiment, each of the fiber tips can be integrated into and along a perimeter of the mount aperture 408. In this particular implementation, beam axes of respective ones of the plurality of directional optical sources extend across but do not intersect the optical surface 306 of the laser scanner 230. Furthermore, in this configuration, respective ones of the plurality of directional optical sources are configured to emit light beams across the optical surface of the laser scanner so that light from one or more of the light beams is incident on the debris. In some example implementations, the light beams from the plurality of directional optical sources are emitted individually in a predefined sequence. Moreover, in this configuration, the light is collected individually by the optical detector 310 for respective ones of the light beams to form respective images, one or more of which indicates the presence of the debris on the optical surface of the laser scanner.

Similar to the description of FIG. 4B, the laser scanner 230 and/or inspection system 400 is moved so that the optical surface 306 is positioned over the mount aperture 408 and exposed to the optical detector 310 contained in the housing 402. In this way, the mount aperture is covered by the laser scanner to block ambient light from entering the housing through the mount aperture and the housing aperture.

Once the laser scanner 230 and optical surface 306 are placed over the mount aperture 408, the directional optical source 302 is activated (as described above) to emit beam(s) of light across the mount aperture and thereby the optical surface. In some example implementations, a beam axis of the directional optical source extends across but does not intersect the optical surface of the laser scanner. The beam of light extends across the optical surface between the optical surface and the optical detector. The directional optical source is configured to emit the light beam across the optical surface of the laser scanner so that light from the light beam is incident on debris disposed on the optical surface.

FIG. 5A illustrates an example laser scanner 230 according to some implementations of the present disclosure. The laser scanner can be attached to a movable structure, such as for example, a moveable arm, a robotic arm, crane, or other suitable movable structure. Via the moveable structure, the laser scanner can be brought to the inspection system 400 like the one mounted on the beam/wall in FIG. 4A. The laser scanner is used for any suitable purpose, including laser ablation of surfaces. The optical surface 306 described herein can be a surface of a lens of the laser scanner through which laser beams are emitted.

FIG. 5B illustrates a close-up of the optical surface 306 of the laser scanner 230 illustrated in FIG. 5A. The inspection system 400 of the present disclosure is configured to inspect any suitably shaped and sized optical surface. Thus, while the optical surface in FIG. 5B is illustrated as being circular, the methods and devices of the present subject matter can be used to inspect optical surfaces of any size or shape as long as the diameter, length, and/or width is less than or equal to the diameter, length, and/or width of the housing aperture 404 or mount aperture 408.

As illustrated in FIG. 6, in some example implementations, at least one of the laser scanner 230 or the inspection system 400 is moved so that the optical surface 306 is positioned over the housing aperture 404, or the mount aperture 408, if the mount 406 is attached to the housing 402. The optical surface is then exposed to the optical detector 310 (described further hereinbelow) contained within the housing, and so that the housing aperture and/or the mount aperture is covered by the laser scanner to block ambient light from entering the housing through the housing aperture and/or the mount aperture. This is done to ensure only light from the directional optical source 302 is detected by the optical detector.

The inspection system 400 is then triggered to begin inspecting the optical surface 306, one or more beams of light are emitted by directional optical source 302, across the housing aperture 404 and/or mount aperture 408 and thereby across and above the optical surface. The same process occurs regardless if the inspection system is moved to the laser scanner or vice-versa. The light deflected by the debris D is then captured by the optical detector 310.

Furthermore, in some example implementations, the inspection system 400 comprises a computer 308 either integrated within the system or as a separate workstation. For example, the inspection system mounted on the wall in FIG. 4A can have a computer workstation attached to it. Alternatively, the computer can be a device separate from the inspection system at a distance and connected to the inspection system via a network (e.g., via the Internet, a wireless carrier communication network, via Bluetooth®, via Wi-Fi, via a local area network (LAN), etc.).

In some example implementations, the computer 308 is configured to receive images captured by the optical detector 310. In such implementations, the computer is configured to take the captured images and create a composite image from the respective images. Furthermore, the computer is configured to process the composite image to determine pixels in the composite image that have an intensity above a threshold that indicates the presence of the debris.

As discussed herein, in some example implementations, the images can be captured while the directional optical source 302 on each side of the mount aperture 408 is activated to capture the respective images. In order to create the composite image, multiple of the respective images can be overlaid or superimposed together. Various image filters can be applied to achieve clearer images. The goal is to get rid of the reflection from the optical surface 306. With respect to determining pixels in the composite image that have intensity values above a threshold, the threshold is determined based on a manual method. UV laser ablation of white HDPE (high density polyethylene) plastic sheet will turn it to dark gray. A dirty lens (i.e., optical surface) can show some voids. It can be difficult to capture that in the image as the HDPE sheet sometimes has to be tilted to see the dark gray voids. When a dirty lens is detected through the HDPE sheet detection manually, the threshold that indicates the presence of the debris can be determined. In other words, the intensity threshold is determined by inspecting an optical surface with known debris on it, determining the intensity values associated with the known debris, and setting the threshold based on the intensity values associated with the known debris.

In some example implementations, the computer 308 is configured to generate feedback to alert a user of the presence of debris D on the optical surface 306 as described herein. For example, the computer may send an alert to a user, transmit an error message, sound an alarm (e.g., such as a buzz), and transmit any other suitable signal to inform the user of the presence of the debris on the optical surface.

In some example implementations, the computer 308 is configured to control the directional optical source 302 and the optical detector 310. For example, the computer can be programmed to send a signal to the directional optical source to emit one or more beams of light based on a pre-programmed pattern. Additionally, the computer can be configured to capture images by sending a signal to the optical detector to take an image of light coming from the optical surface 306.

FIG. 7A and FIG. 7B are example composite images 700A and 700B generated by capturing pictures of a laser scanner lens using an example implementation of the inspection system 300 of the present disclosure. As shown in both FIGS. 7A and 7B, there are several areas 702A and 702B (specks and lines shown against the background) that were captured indicating that at least some debris is disposed on the laser scanner lens. In order to differentiate between what is background in the images (i.e., no debris) and what is debris, intensity levels of the pixels in the images are determined and compared. Pixels that have an intensity above a threshold, determination of which is described above, indicates the presence of the debris as described above.

FIGS. 8A-8C are flowcharts illustrating various steps in a method 800 of inspecting an optical surface of a laser scanner with an inspection system that includes a directional optical source and an optical detector, according to various example implementations of the present disclosure. The method includes moving at least one of the laser scanner or the inspection system to a position in which a beam axis of the directional optical source extends across but does not intersect the optical surface of the laser scanner, between the optical surface of the laser scanner and the optical detector, as shown at block 802 of FIG. 8A. The method includes emitting a light beam from the directional optical source, across the optical surface of the laser scanner so that light from the light beam is incident on debris disposed on the optical surface of the laser scanner, as shown at block 804. The method includes collecting the light at the optical detector to form an image that indicates presence of the debris on the optical surface of the laser scanner, as shown at block 806. And the method includes generating feedback to alert a user of the presence of the debris, as shown at block 808.

In some examples, in the position to which the at least one of the laser scanner or the inspection system is moved at block 802, the directional optical source is positioned on a perimeter of the optical surface of the laser scanner.

In some examples, the inspection system includes a housing in which the optical detector is contained. In some of these examples, the housing defines a housing aperture, and the directional optical source is positioned on a perimeter of the housing aperture.

In some examples, the directional optical source includes an optical fiber configured to carry light to a fiber tip at which light beam is emitted at block 804, and the fiber tip is positioned on the perimeter of the housing aperture so that the light beam is emitted across the housing aperture.

In some examples, the directional optical source is contained in the housing of the inspection system, and In some of these examples, the at least one of the laser scanner or the inspection system is moved at block 802 so that the optical surface is positioned over the housing aperture and exposed to the optical detector contained in the housing, and so that the housing aperture is covered by the laser scanner to block ambient light from entering the housing through the housing aperture.

In some examples, the inspection system further includes a mount on an outer surface of the housing over the housing aperture. In some of these examples, the mount defines a mount aperture that overlaps the housing aperture, and the directional optical source is positioned on a perimeter of the mount aperture and thereby the perimeter of the housing aperture.

In some examples, the directional optical source includes an optical fiber configured to carry light to a fiber tip at which light beam is emitted at block 804, and the fiber tip is positioned on the perimeter of the mount aperture so that the light beam is emitted across the mount aperture and thereby the housing aperture.

In some examples, the at least one of the laser scanner or the inspection system is moved at block 802 so that the optical surface is positioned over the mount aperture and exposed to the optical detector contained in the housing, and so that the mount aperture is covered by the laser scanner to block ambient light from entering the housing through the mount aperture and the housing aperture.

In some examples, the inspection system includes a plurality of directional optical sources, and in the position to which the at least one of the laser scanner or the inspection system is moved at block 802, beam axes of respective ones of the plurality of directional optical sources extend across but do not intersect the optical surface of the laser scanner. In some of these examples, emitting the light beam at block 804 includes emitting light beams from respective ones of the plurality of directional optical sources, across the optical surface of the laser scanner so that light from one or more of the light beams is incident on the debris, as shown at block 810 of FIG. 8B.

In some examples, the light beams are emitted at block 810 individually, and the light is collected at block 806 individually for respective ones of the light beams to form respective images one or more of which indicates the presence of the debris on the optical surface of the laser scanner.

In some examples, the method 800 further includes creating a composite image from the respective images, as shown at block 812 of FIG. 8C. In some of these examples, the method also includes processing the composite image to determine pixels in the composite image that have an intensity above a threshold that indicates the presence of the debris, as shown at block 814.

In some examples, the optical surface is of a lens through which laser beams are emitted from the laser scanner.

In some examples, the optical detector comprises a camera configured to collect the light at block 806 to form the image that indicates the presence of the debris.

In some examples, the directional optical source comprises light emitting diodes (LEDs).

As explained above and reiterated below, the present disclosure includes, without limitation, the following example implementations.

Clause 1. An inspection system for inspecting an optical surface of a laser scanner, the inspection system comprising: a directional optical source configured to emit a light beam when at least one of the laser scanner or the inspection system are moved to a position in which a beam axis of the directional optical source extends across but does not intersect the optical surface of the laser scanner, between the optical surface of the laser scanner and the optical detector, the directional optical source configured to emit the light beam across the optical surface of the laser scanner so that light from the light beam is incident on debris disposed on the optical surface of the laser scanner; an optical detector configured to collect the light to form an image that indicates presence of the debris on the optical surface of the laser scanner; and a computer configured to generate feedback to alert a user of the presence of the debris.

Clause 2. The inspection system of clause 1, wherein in the position to which the at least one of the laser scanner or the inspection system is moved, the directional optical source is positioned on a perimeter of the optical surface of the laser scanner.

Clause 3. The inspection system of clause 1 or clause 2, wherein the inspection system further comprises a housing in which the optical detector is contained, and wherein the housing defines a housing aperture, and the directional optical source is positioned on a perimeter of the housing aperture.

Clause 4. The inspection system of clause 3, wherein the directional optical source includes an optical fiber configured to carry light to a fiber tip at which light beam is emitted, and the fiber tip is positioned on the perimeter of the housing aperture so that the light beam is emitted across the housing aperture.

Clause 5. The inspection system of clause 3 or clause 4, wherein the directional optical source is contained in the housing of the inspection system, and wherein the at least one of the laser scanner or the inspection system is moved so that the optical surface is positioned over the housing aperture and exposed to the optical detector contained in the housing, and so that the housing aperture is covered by the laser scanner to block ambient light from entering the housing through the housing aperture.

Clause 6. The inspection system of any of clauses 3 to 5, wherein the inspection system further comprises a mount on an outer surface of the housing over the housing aperture, and wherein the mount defines a mount aperture that overlaps the housing aperture, and the directional optical source is positioned on a perimeter of the mount aperture and thereby the perimeter of the housing aperture.

Clause 7. The inspection system of clause 6, wherein the directional optical source includes an optical fiber configured to carry light to a fiber tip at which light beam is emitted, and the fiber tip is positioned on the perimeter of the mount aperture so that the light beam is emitted across the mount aperture and thereby the housing aperture.

Clause 8. The inspection system of clause 6 or clause 7, wherein the at least one of the laser scanner or the inspection system is moved so that the optical surface is positioned over the mount aperture and exposed to the optical detector contained in the housing, and so that the mount aperture is covered by the laser scanner to block ambient light from entering the housing through the mount aperture and the housing aperture.

Clause 9. The inspection system of any of clauses 1 to 8, wherein the inspection system includes a plurality of directional optical sources, and in the position to which the at least one of the laser scanner or the inspection system is moved, beam axes of respective ones of the plurality of directional optical sources extend across but do not intersect the optical surface of the laser scanner, and wherein the directional optical source configured to emit the light beam includes respective ones of the plurality of directional optical sources configured to emit light beams across the optical surface of the laser scanner so that light from one or more of the light beams is incident on the debris.

Clause 10. The inspection system of clause 9, wherein the light beams are emitted individually, and the light is collected individually for respective ones of the light beams to form respective images one or more of which indicates the presence of the debris on the optical surface of the laser scanner.

Clause 11. The inspection system of clause 10, wherein the computer is configured to at least: create a composite image from the respective images; process the composite image to determine pixels in the composite image that have an intensity above a threshold that indicates the presence of the debris.

Clause 12. The inspection system of any of clauses 1 to 11, wherein the optical surface is of a lens through which laser beams are emitted from the laser scanner.

Clause 13. The inspection system of any of clauses 1 to 12, wherein the optical detector comprises a camera configured to collect the light to form the image that indicates the presence of the debris.

Clause 14. The inspection system of any of clauses 1 to 13, wherein the directional optical source comprises light emitting diodes (LEDs).

Clause 15. A method of inspecting an optical surface of a laser scanner with an inspection system that includes a directional optical source and an optical detector, the method comprising: moving at least one of the laser scanner or the inspection system to a position in which a beam axis of the directional optical source extends across but does not intersect the optical surface of the laser scanner, between the optical surface of the laser scanner and the optical detector; emitting a light beam from the directional optical source, across the optical surface of the laser scanner so that light from the light beam is incident on debris disposed on the optical surface of the laser scanner; collecting the light at the optical detector to form an image that indicates presence of the debris on the optical surface of the laser scanner; and generating feedback to alert a user of the presence of the debris.

Clause 16. The method of clause 15, wherein in the position to which the at least one of the laser scanner or the inspection system is moved, the directional optical source is positioned on a perimeter of the optical surface of the laser scanner.

Clause 17. The method of clause 15 or clause 16, wherein the inspection system includes a housing in which the optical detector is contained, and wherein the housing defines a housing aperture, and the directional optical source is positioned on a perimeter of the housing aperture.

Clause 18. The method of clause 17, wherein the directional optical source includes an optical fiber configured to carry light to a fiber tip at which light beam is emitted, and the fiber tip is positioned on the perimeter of the housing aperture so that the light beam is emitted across the housing aperture.

Clause 19. The method of clause 17 or clause 18, wherein the directional optical source is contained in the housing of the inspection system, and wherein the at least one of the laser scanner or the inspection system is moved so that the optical surface is positioned over the housing aperture and exposed to the optical detector contained in the housing, and so that the housing aperture is covered by the laser scanner to block ambient light from entering the housing through the housing aperture.

Clause 20. The method of any of clauses 17 to 19, wherein the inspection system further includes a mount on an outer surface of the housing over the housing aperture, and wherein the mount defines a mount aperture that overlaps the housing aperture, and the directional optical source is positioned on a perimeter of the mount aperture and thereby the perimeter of the housing aperture.

Clause 21. The method of clause 20, wherein the directional optical source includes an optical fiber configured to carry light to a fiber tip at which light beam is emitted, and the fiber tip is positioned on the perimeter of the mount aperture so that the light beam is emitted across the mount aperture and thereby the housing aperture.

Clause 22. The method of clause 20 or clause 21, wherein the at least one of the laser scanner or the inspection system is moved so that the optical surface is positioned over the mount aperture and exposed to the optical detector contained in the housing, and so that the mount aperture is covered by the laser scanner to block ambient light from entering the housing through the mount aperture and the housing aperture.

Clause 23. The method of any of clauses 15 to 22, wherein the inspection system includes a plurality of directional optical sources, and in the position to which the at least one of the laser scanner or the inspection system is moved, beam axes of respective ones of the plurality of directional optical sources extend across but do not intersect the optical surface of the laser scanner, and wherein emitting the light beam includes emitting light beams from respective ones of the plurality of directional optical sources, across the optical surface of the laser scanner so that light from one or more of the light beams is incident on the debris.

Clause 24. The method of clause 23, wherein the light beams are emitted individually, and the light is collected individually for respective ones of the light beams to form respective images one or more of which indicates the presence of the debris on the optical surface of the laser scanner.

Clause 25. The method of clause 24 further comprising: creating a composite image from the respective images; processing the composite image to determine pixels in the composite image that have an intensity above a threshold that indicates the presence of the debris.

Clause 26. The method of any of clauses 15 to 25, wherein the optical surface is of a lens through which laser beams are emitted from the laser scanner.

Clause 27. The method of any of clauses 15 to 26, wherein the optical detector comprises a camera configured to collect the light to form the image that indicates the presence of the debris.

Clause 28. The method of any of clauses 15 to 27, wherein the directional optical source comprises light emitting diodes (LEDs).

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An inspection system for inspecting an optical surface of a laser scanner, the inspection system comprising:
a directional optical source configured to emit a light beam when at least one of the laser scanner or the inspection system are moved to a position in which a beam axis of the directional optical source extends across but does not intersect the optical surface of the laser scanner, between the optical surface of the laser scanner and an optical detector, the directional optical source configured to emit the light beam across the optical surface of the laser scanner so that light from the light beam is incident on debris disposed on the optical surface of the laser scanner;
the optical detector configured to collect the light to form an image that indicates presence of the debris on the optical surface of the laser scanner; and
a computer configured to generate feedback to alert a user of the presence of the debris.

2. The inspection system of claim 1, wherein in the position to which the at least one of the laser scanner or the inspection system is moved, the directional optical source is positioned on a perimeter of the optical surface of the laser scanner.

3. The inspection system of claim 1, wherein the inspection system further comprises a housing in which the optical detector is contained, and
wherein the housing defines a housing aperture, and the directional optical source is positioned on a perimeter of the housing aperture.

4. The inspection system of claim 3, wherein the directional optical source includes an optical fiber configured to carry light to a fiber tip at which a light beam is emitted, and the fiber tip is positioned on the perimeter of the housing aperture so that the light beam is emitted across the housing aperture.

5. The inspection system of claim 3, wherein the directional optical source is contained in the housing of the inspection system, and
wherein the at least one of the laser scanner or the inspection system is moved so that the optical surface is positioned over the housing aperture and exposed to the optical detector contained in the housing, and so that the housing aperture is covered by the laser scanner to block ambient light from entering the housing through the housing aperture.

6. The inspection system of claim 3, wherein the inspection system further comprises a mount on an outer surface of the housing over the housing aperture, and
wherein the mount defines a mount aperture that overlaps the housing aperture, and the directional optical source is positioned on a perimeter of the mount aperture and thereby the perimeter of the housing aperture.

7. The inspection system of claim 6, wherein the directional optical source includes an optical fiber configured to carry light to a fiber tip at which a light beam is emitted, and the fiber tip is positioned on the perimeter of the mount aperture so that the light beam is emitted across the mount aperture and thereby the housing aperture.

8. The inspection system of claim 6, wherein the at least one of the laser scanner or the inspection system is moved so that the optical surface is positioned over the mount aperture and exposed to the optical detector contained in the housing, and so that the mount aperture is covered by the laser scanner to block ambient light from entering the housing through the mount aperture and the housing aperture.

9. The inspection system of claim 1, wherein the inspection system includes a plurality of directional optical sources, and in the position to which the at least one of the laser scanner or the inspection system is moved, beam axes of respective ones of the plurality of directional optical sources extend across but do not intersect the optical surface of the laser scanner,
wherein the directional optical source configured to emit the light beam includes respective ones of the plurality of directional optical sources configured to emit light beams across the optical surface of the laser scanner so that light from one or more of the light beams is incident on the debris,
wherein the light beams are emitted individually, and the light is collected individually for respective ones of the light beams to form respective images one or more of which indicates the presence of the debris on the optical surface of the laser scanner, and
wherein the computer is configured to at least:
create a composite image from the respective images; and
process the composite image to determine pixels in the composite image that have an intensity above a threshold that indicates the presence of the debris.

10. The inspection system of claim 1, wherein the optical surface is of a lens through which laser beams are emitted from the laser scanner, or
wherein the optical detector comprises a camera configured to collect the light to form the image that indicates the presence of the debris, or
wherein the directional optical source comprises light emitting diodes (LEDs).

11. A method of inspecting an optical surface of a laser scanner with an inspection system that includes a directional optical source and an optical detector, the method comprising:
moving at least one of the laser scanner or the inspection system to a position in which a beam axis of the directional optical source extends across but does not intersect the optical surface of the laser scanner, between the optical surface of the laser scanner and the optical detector;
emitting a light beam from the directional optical source, across the optical surface of the laser scanner so that light from the light beam is incident on debris disposed on the optical surface of the laser scanner;
collecting the light at the optical detector to form an image that indicates presence of the debris on the optical surface of the laser scanner; and
generating feedback to alert a user of the presence of the debris.

12. The method of claim 11, wherein in the position to which the at least one of the laser scanner or the inspection system is moved, the directional optical source is positioned on a perimeter of the optical surface of the laser scanner.

13. The method of claim 11, wherein the inspection system includes a housing in which the optical detector is contained, and
wherein the housing defines a housing aperture, and the directional optical source is positioned on a perimeter of the housing aperture.

14. The method of claim 13, wherein the directional optical source includes an optical fiber configured to carry light to a fiber tip at which a light beam is emitted, and the fiber tip is positioned on the perimeter of the housing aperture so that the light beam is emitted across the housing aperture.

15. The method of claim 13, wherein the directional optical source is contained in the housing of the inspection system, and
wherein the at least one of the laser scanner or the inspection system is moved so that the optical surface is positioned over the housing aperture and exposed to the optical detector contained in the housing, and so that the housing aperture is covered by the laser scanner to block ambient light from entering the housing through the housing aperture.

16. The method of claim 13, wherein the inspection system further includes a mount on an outer surface of the housing over the housing aperture, and
wherein the mount defines a mount aperture that overlaps the housing aperture, and the directional optical source is positioned on a perimeter of the mount aperture and thereby the perimeter of the housing aperture.

17. The method of claim 16, wherein the directional optical source includes an optical fiber configured to carry light to a fiber tip at which a light beam is emitted, and the fiber tip is positioned on the perimeter of the mount aperture so that the light beam is emitted across the mount aperture and thereby the housing aperture.

18. The method of claim 16, wherein the at least one of the laser scanner or the inspection system is moved so that the optical surface is positioned over the mount aperture and exposed to the optical detector contained in the housing, and so that the mount aperture is covered by the laser scanner to block ambient light from entering the housing through the mount aperture and the housing aperture.

19. The method of claim 11, wherein the inspection system includes a plurality of directional optical sources, and in the position to which the at least one of the laser scanner or the inspection system is moved, beam axes of respective ones of the plurality of directional optical sources extend across but do not intersect the optical surface of the laser scanner, wherein emitting the light beam includes emitting light beams from respective ones of the plurality of directional optical sources, across the optical surface of the laser scanner so that light from one or more of the light beams is incident on the debris, wherein the light beams are emitted individually, and the light is collected individually for respective ones of the light beams to form respective images one or more of which indicates the presence of the debris on the optical surface of the laser scanner, and the method further comprising:

creating a composite image from the respective images;

processing the composite image to determine pixels in the composite image that have an intensity above a threshold that indicates the presence of the debris.

20. The method of claim 11, wherein the optical surface is of a lens through which laser beams are emitted from the laser scanner, or wherein the optical detector comprises a camera configured to collect the light to form the image that indicates the presence of the debris, or wherein the directional optical source comprises light emitting diodes (LEDs).

* * * * *